S. COTTLE.

Chains and Chain-Links for Necklaces, &c.

No. 5,774. Reissued Feb. 24, 1874.

WITNESSES:

A. W. Almqvist

Solon Kemon

INVENTOR:

Shubael Cottle

BY Munn & Co

ATTORNEYS.

AM. PHOTO-LITHOGRAPHIC Co. N. Y. (OSBORNE'S PROCESS.)

UNITED STATES PATENT OFFICE.

SHUBAEL COTTLE, OF NEW YORK, N. Y., ASSIGNOR TO MULFORD, HALE & COTTLE, OF SAME PLACE.

IMPROVEMENT IN CHAINS AND CHAIN-LINKS FOR NECKLACES, &c.

Specification forming part of Letters Patent No. 147,045, dated February 3, 1874; reissue No. 5,774, dated February 24, 1874; application filed February 21, 1874.

*To all whom it may concern:*

Be it known that I, SHUBAEL COTTLE, of the city, county, and State of New York, have invented a new and useful Improvement in Chains for Necklaces, &c.; and I do hereby declare that the following is a full, clear, and exact description of the same, reference being had to the accompanying drawing, forming a part of this specification, in which—

Figure 1:
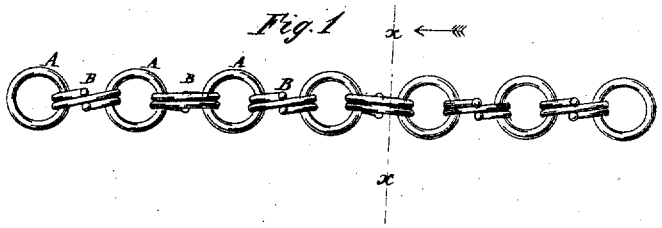
Figure 2:
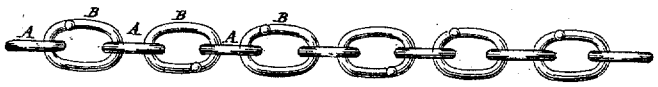
Figure 3:
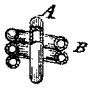

Figure 1 is a side view of a portion of a chain-necklace illustrating my invention. Fig. 2 is a view of the same turned one quarter around. Fig. 3 is a cross-section of the same, taken through the line *y y*, Fig. 1.

My invention has for its object to furnish an improved chain for necklaces, &c., having links of peculiar construction, which enable all the links to be finished separate, and then put together to form the chain. The invention consists in an ornamental chain whereof the links are connected together by open spiral links B finished before being connected together, the connection being made by springing the finished links into each other in the manner described.

I will now describe the chain represented in the drawing to illustrate my invention.

A and B represent the links of the chain. The links A are round and closed, as shown in Fig. 1, and are made and polished or colored separately from the other links. The links B, which constitute the peculiar feature of my invention, are formed of one or more coils of tubing of the proper length, so as to form a double spring-link. Into each end of the tube forming the link B is soldered a small shot, as shown in the drawing, which shot gives a finish to the link. The links B may then be colored or polished, and the chain is formed by springing the links into each other. The links A B may be made the one kind round and the other oval, or both may be made round, or both oval.

The first construction is preferred, as producing a more elegant chain. Either kind of the links A B may be polished and the other colored, or both may be polished or both colored, but I prefer to polish the closed links and color the open spiral links, as producing a more pleasing effect. By this construction the links may be made and finished in quantities, and the chain formed from the finished links by springing them into each other to produce any desired combination of the links of the same or different kinds. Finishing the separate links in this way enables them to be more perfectly polished or colored, and with a greatly diminished expenditure of labor and time, and enables the links to be put together without injuring them in the least, however highly they may be polished or colored.

Having thus described my invention, what I claim, is—

1. An ornamental chain for necklaces, &c., formed of alternate closed links A and open spiral links B, substantially as shown and described.

2. The open spiral link B formed of coils of tubing, substantially as shown and described.

SHUBAEL COTTLE.

Witnesses:
JAMES T. GRAHAM,
T. B. MOSHER.